Figure 1:
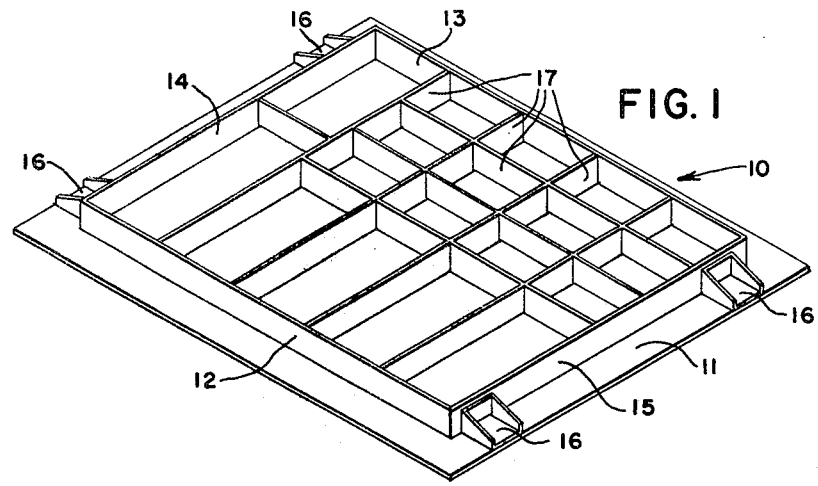

May 18, 1965  A. BURWEN  3,184,349

HEAT TREATMENT OF PRECISION ALUMINUM ASSEMBLIES

Filed April 8, 1963

INVENTOR:
ARTHUR BURWEN
BY
*Hopgood & Calhoun*
ATTORNEYS 3,184,349
HEAT TREATMENT OF PRECISION ALUMINUM
ASSEMBLIES
Arthur Burwen, Wakefield, Mass., assignor to Ovitron
Corporation, Newburgh, N.Y., a corporation of
Delaware
Filed Apr. 8, 1963, Ser. No. 271,434
1 Claim. (Cl. 148—125)

This invention relates to a method of heat treating complicated metal shapes which, under normal heat treating quenching procedures, are subject to distortion. In particular, the invention is directed to a method of heat treating precision aluminum assemblies comprised of an integrated array of thin structural elements formed of an age-hardenable aluminum alloy.

Properties of aluminum, including the age-hardenable alloys, particularly the weight and strength properties, make aluminum adaptable to a wide variety of products. Wrought aluminum products have found increased use in the electronics industry, particularly as a structural material, for example, in the construction of light weight complicated assemblies for supporting electronic components and the like.

As generally the strength properties of aluminum alloys are optimized by age-hardening, it is essential that the age-hardenable alloy be solution quenched by rapidly cooling it from an elevated solution temperature. The alloy is held at the high temperature until a homogeneous solid solution is obtained, and then rapidly cooled or quenched (e.g., in water) so that there is no time for the hardening elements, such as Mg, Si, Cu, Cr, etc., to precipitate as a phase from the solid solution during the cooling period. Thereafter, the solution treated alloy is subjected to age-hardening by heating it to a temperature below the solution temperature thereby to cause the hardening phases to precipitate into the aluminum matrix and thus strengthen the alloys. Generally, the foregoing heat treating procedure causes undue distortion of the formed parts, particularly in complicated shapes, such as precision built aluminum assemblies.

For example, the problem is particularly acute in the construction of one type of aluminum assembly for supporting a plurality of electronic components in which aluminum elements in the form of thin and long sections are integrated into a substantially rectangular assembly, e.g., an egg crate type of structure of about 8 inches wide, 14 inches long and one inch thick. In forming the assembly, a brazing material, such as a brazing paste, or a brazing alloy in the form of shims, is applied to the abutting portions of the elements to be brazed. The prepared assembly which is held in a jig is preheated to about 1000° F. and then dipped brazed at a temperature of about 1100° F. in a molten flux bath for about three minutes, after which it is removed and allowed to cool.

Because of the brazing temperature employed in producing the assembly, the alloy material has a soft temper and must be hardened. The procedure employed is to heat the assembly to a temperature of, for example, 970° F., followed by quenching in water. Thereafter, it is aged at a lower temperature, such as 270° F., as is employed for the aluminum alloy known in the trade by the designation 6061. Generally, the quenching heat treatment results in undue distortion of the assembly. Attempts to minimize it by placing the assembly in a jig prior to the quenching treatment has not been too successful due in part to the difficulty in adequately jigging the complicated shape. Quenching in a hot liquid bath, for example in boiling water, to reduce heat shock has likewise not been too successful in minimizing distortion.

I have now discovered that I can overcome the foregoing difficulties by utilizing a quench cooling technique which gives me the desired solution treatment of the alloy while substantially reducing distortion of the assembly.

It is an object of my invention to provide a method for quench cooling a complicated metal shape while substantially avoiding distortion of the shape.

Another object of my invention is to provide a method for solution heat treating an aluminum assembly of complicated shape formed of integrated structural elements of an age-hardenable aluminum alloy while maintaining the overall dimensions of said assembly to close tolerances.

Figure 2:
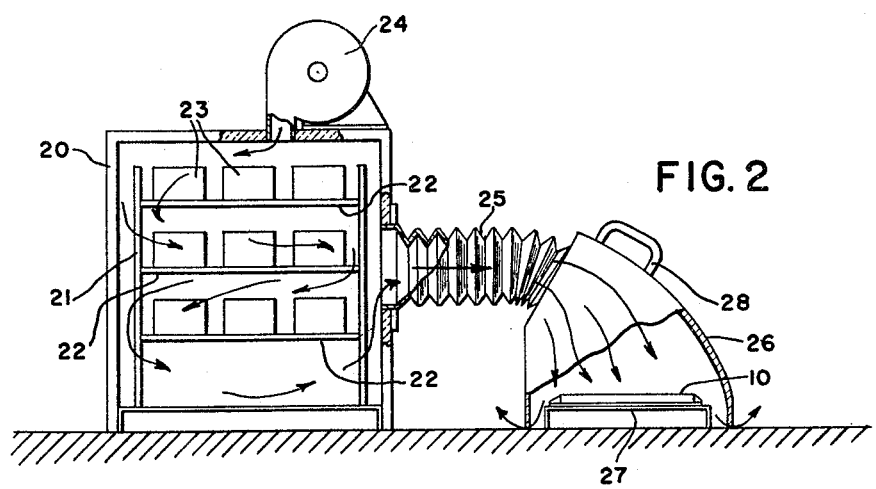

These and other objects will more clearly appear when taken in conjunction with the following disclosure and the accompanying drawing, wherein:

FIG. 1 depicts generally in three dimensions one type of precision assembly capable of being heat treated in accordance with the invention; and FIG. 2 is illustrative of one embodiment which may be employed in carrying out the method of the invention.

Stating it broadly, I provide a method of quench cooling a complicated metal shape from an elevated temperature which normally is subject to distortion which comprises, heating said metal shape to said elevated temperature, and quench cooling said heated metal shape by directing a continuous flow of a refrigerated gaseous stream substantially simultaneously to all parts of said shape. I find that the foregoing method is particularly applicable to the quench cooling of complicated metal shapes formed of thin integrated elements of an age-hardenable aluminum alloy. As illustrative of one type of shape which presents distortion problems, reference is made to FIG. 1 which shows a precision aluminum assembly designated generally by the numeral 10 produced from thin sections of an aluminum alloy known by the designation 6061.

The assembly is comprised of a precision machined base plate 11 having selected areas with perforations (not shown), and having edge brazed to the top surface thereof and with each other a plurality of thin aluminum alloy strips arranged at substantially right angles to each other in a sort of egg crate structure. The structure comprises longitudinal members 12, 13 which form an outer rectangular configuration with transverse members 14, 15. The members are edge brazed to each other and to the surface of plate 11. In addition, members 14 and 15 are further connected to the base plate via brazed corner lugs 16.

A plurality of smaller rectangles or compartments are formed within the larger rectangle via brazed partitions 17 also of thin aluminum alloy strips. The compartments formed are adapted to receive electronic components in mounting relationship therewith.

As electronic equipment becomes more complicated, the leakage of radio frequency (RF) signals from external sources into an electronic system or the leakage of signals from one compartment to an adjacent compartment presents a problem in that the RF signals may interfere with each other or may tend to heterodyne with a basic signal to create a wrong response. It is important that the assembly housing the electronic components be substantially free from distortion and held to close dimensional tolerances to avoid leakage. In addition the structural aluminum elements making up the assembly should have sufficient strength to withstand the application of externally applied stresses due to handling without bending or distorting.

When an aluminum alloy assembly is produced by brazing, the temperature employed is generally so high that the alloy material softens to a hardness of $T_0$, loses its strength and must be solution treated and age-hardened back to a hardness of T4 to T6 to regain its strength. To accomplish this, and still avoid undue distortion, I heat the brazed assembly formed of the alloy 6061 to about 970° F. and then quench it by directing a massive flow of a refrigerated gaseous stream substantially simultaneously to all parts of the assembly and continuing the flow thereto until the assembly has cooled down to below the age-hardening temperature of the alloy from which it is constructed.

One embodiment for carrying out the method is shown in FIG. 2 which depicts a container 20 having therein a rack 21 with shelves 22 having openings therein, each shelf supporting blocks of Dry Ice 23 at a temperature of about —90° F. An air pump 24 communicates with the top of the container and is adapted to force a massive flow of air, for example about 1000 cubic ft. per minute, into the chamber containing the Dry Ice and circulate it about the blocks of Dry Ice in the manner shown by the arrows. The air is refrigerated to below 0° F., for example, in the range of about —40° to —50° F., and then caused to leave the container via flexible corrugated conduit 25 under high velocity into hood 26 in which is confined heated aluminum assembly 10 which is associated with a jig or support 27. The hood is provided with a handle 28 by which the hood can be raised manually for inserting or removing the heated assembly to be quenched.

In solution treating the assembly in FIG. 2, it is heated in an oven (not shown) located near the quenching hood. When the assembly reaches the desired temperature, it is inserted under the hood within a few seconds and refrigerated air then circulated therethrough. The amount of cool air being circulated through container 20 by means of air pump 24 should be sufficient to flood immediately all parts of the entire assembly simultaneously as to insure substantially uniform cooling of the assembly throughout.

As stated above, the temperature of the Dry Ice is in the neighborhood of about —90° F. The circulation of the air is such that its temperature is immediately lowered to below 0° F. before it reaches quenching hood 26, the flow rate being such that the refrigerated air is maintained under positive pressure relative to the surrounding atmosphere so that it is forced-out from under the hood. The circulation is continued until the heated aluminum assembly is cooled to the desired temperature, for example to room temperature or below the age-hardening temperature of the aluminum alloy.

It will be appreciated by those skilled in the art that the invention need not be limited to the method shown in FIG. 2. For example, any method of refrigeration may be employed just so long that the air is circulated in heat exchanging relationship with the cool portion of the apparatus to give the desired temperature. The cool portion may be an aluminum evaporator cooled by expanding Freon in the known manner to below 0° F. or, if desired, in any other type of refrigeration device capable of cooling gas to sub-atmospheric or sub-zero temperatures.

While the invention has been described with specific reference to refrigerated air as the quenching medium, it need not be limited thereto. For example, any refrigerated gas may be employed, such as nitrogen, argon, carbondioxide, etc. By refrigerated gas is meant any gas which has been cooled to below normal freezing temperatures, such as below 32° F. and, preferably, below 0° F. (for example, below —10° F. or even —15° F.).

Likewise, while the invention has been described with respect to the heat treatment of age-hardenable aluminum alloy, it is to be understood that it is applicable to complicated shapes formed of other metals, such as iron, iron alloys, copper, copper alloys, etc., which on quench cooling in the conventional manner tend to undergo undue distortion.

Preferably, the invention is applicable to wrought aluminum and age-hardenable aluminum alloys. Such alloys and their properties including their heat treatment, are discussed in quite some detail on pages 935 to 950 of the "ASM Metals Handbook" (8th edition, 1961), and in the book entitled Physical Metallurgy of Aluminum Alloys (American Society for Metals, 1949). Examples of such alloys are 6061 (1% Mg. 0.6% Si, 0.25% Cu, 0.25% Cr and the balance Al); 6063 (0.7% Mg, 0.4% Si and the balance Al); 6101 (0.5% Mg, 0.5% Si and the balance Al); 6151 (1% Si, 0.6% Mg, 0.25% Cr and the balance Al), and the like. Generally, such alloys have an aluminum content of at least about 85%. The term "aluminous metal" is meant to include such alloys as well as aluminum per se.

Although the present invention has been described in conjunction with preferred embodiments, it is to be understood that modifications and variations may be resorted to without departing from the spirit and scope of the invention as those skilled in the art will readily understand. Such modifications and variations are considered to be within the purview and scope of the invention and the appended claim.

I claim:

A method of quenching cooling from an elevated temperature a complicated metal shape comprising an integrated assembly of thin and long strips of an age-hardenable aluminum alloy which shape is subject to distortion under normal quenching conditions which comprises, heating said metal shape to an elevated temperature corresponding to the solution temperature of said age-hardenable aluminum alloy, quench cooling said shape from said solution temperature by directing a massive flow of approximately 1000 cubic feet per minute of a refrigerated gaseous stream of temperature below 0° F. substantially simultaneously to all parts of said metal shape, and continuing said flow of refrigerated gas to substantially all parts of said metal shape until the metal shape has cooled to below its age-hardening temperatures.

References Cited by the Examiner

UNITED STATES PATENTS

| 754,301 | 3/04 | Hadfield | 148—125 |
| 2,129,670 | 9/38 | Brunner | 148—157 |
| 2,275,070 | 3/42 | Adamoli | 148—159 |
| 2,305,811 | 12/42 | Oeckl | 148—157 |
| 2,446,166 | 8/48 | Eades | 148—125 |
| 2,824,818 | 2/58 | Swenson | 148—125 |
| 2,949,392 | 8/60 | Willey | 148—159 |

DAVID L. RECK, *Primary Examiner.*